United States Patent
Chin et al.

(10) Patent No.: US 8,874,113 B2
(45) Date of Patent: Oct. 28, 2014

(54) METHODS AND MECHANISMS FOR MANAGING PRIORITY CALLS IN A CELL

(75) Inventors: Chen-Ho Chin, Deerlijk (BE); Stefano M. Faccin, Hayward, CA (US); Muhammad Khaledul Islam, Ottawa (CA); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 215 days.

(21) Appl. No.: 13/508,308

(22) PCT Filed: Nov. 5, 2010

(86) PCT No.: PCT/US2010/055591
§ 371 (c)(1),
(2), (4) Date: Nov. 8, 2012

(87) PCT Pub. No.: WO2011/057056
PCT Pub. Date: May 12, 2011

(65) Prior Publication Data
US 2013/0130688 A1  May 23, 2013

Related U.S. Application Data

(60) Provisional application No. 61/259,067, filed on Nov. 6, 2009.

(51) Int. Cl.
| | |
|---|---|
| H04W 88/02 | (2009.01) |
| H04W 36/00 | (2009.01) |
| H04W 36/22 | (2009.01) |
| H04W 84/04 | (2009.01) |

(52) U.S. Cl.
CPC ............ *H04W 36/00* (2013.01); *H01W 76/007* (2013.01); *H04W 84/045* (2013.01); *H04W 36/22* (2013.01)

USPC .......................................................... 455/436

(58) Field of Classification Search
USPC .................................. 455/430–445; 370/331
See application file for complete search history.

(56) References Cited

U.S. PATENT DOCUMENTS

| | | | |
|---|---|---|---|
| 2010/0289640 A1 | 11/2010 | Annamalai | |
| 2012/0218889 A1* | 8/2012 | Watfa et al. | 370/230 |
| 2012/0315907 A1* | 12/2012 | Chin et al. | 455/436 |
| 2014/0051443 A1* | 2/2014 | Diachina et al. | 455/436 |

FOREIGN PATENT DOCUMENTS

WO    2010120689 A2    10/2010

OTHER PUBLICATIONS

3GPP TR 23.869 V9.0.0; 3rd Generation Partnership Project; Technical Specification Group Services and System Aspects; Support for Internet Protocol (IP) Based on IP Multimedia Subsystem (IMS) Emergency Calls Over General Packet Radio Service (GPRS) and Evolved Packet Service (EPS); Release 9; Mar. 2009; 36 pages.
PCT International Search Report; Application No. PCT/US2010/055588; Feb. 10, 2011; 4 pages.

(Continued)

*Primary Examiner* — Diane Mizrahi
(74) *Attorney, Agent, or Firm* — Conley Rose, P.C.; J. Robert Brown, Jr.

(57) ABSTRACT

A method is provided for managing a priority call in a serving cell. The method comprises, when a priority call is in progress in the serving cell, performing at least one of preventing at least one non-priority call from being handed over into the serving cell and preventing at least one non-priority call from being initiated in the serving cell.

24 Claims, 3 Drawing Sheets

(56) References Cited

OTHER PUBLICATIONS

PCT Written Opinion of the International Searching Authority; Application No. PCT/US2010/055588; Feb. 10, 2011; 5 pages.
PCT International Search Report; Application No. PCT/US2010/055591; Feb. 10, 2011; 4 pages.
PCT Written Opinion of the International Searching Authority; Application No. PCT/US2010/055591; Feb. 10, 2011; 5 pages.
3GPP TS 24.008; V10.0.0; 3rd Generation Partnership Project; Technical Specification Group Core Network and Terminals; Mobile Radio Interface Layer 3 Specification; Core Network Protocols; Stage 3; Release 10; Sep. 2010; 616 pages.
3GPP TS 24.301 V10.0.0; 3rd Generation Partnership Project; Technical Specification Group Core Network and Terminals; Non-Access-Stratum (NAS) Protocol for Evolved Packet System (EPS); Stage 3; Release 10; Sep. 2010; 299 pages.
3GPP TS 25.331 V10.1.0; 3rd Generation Partnership Project; Technical Specification Group Radio Access Network; Radio Resource Control (RRC); Protocol Specification; Release 10; Sep. 2010; 1806 pages.
3GPP TS 25.413 V9.4.0; 3rd Generation Partnership Project; Technical Specification Group Radio Access Network; UTRAN Iu Interface Radio Access Network Application Part (RANAP) Signalling; Release 9; Sep. 2010; 407 pages.
3GPP TS 36.331 V9.4.0; 3rd Generation Partnership Project; Technical Specification Group Radio Access Network; Evolved Universal Terrestrial Radio Access (E-UTRA); Radio Resource Control (RRC); Protocol Specification; Release 9; 252 pages.
3GPP TS 36.413 V9.4.0; 3rd Generation Partnership Project; Technical Specification Group Radio Access Network; Evolved Universal Terrestrial Radio Access Network (E-UTRAN); S1 Application Protocol (S1AP); Release 9; Sep. 2010; 241 pages.
3GPP TS 23.009 V9.1.0; 3rd Generation Partnership Project; Technical Specification Group Core Network and Terminals; Handover Procedures; Release 9; Mar. 2010; 295 pages.
Canadian Office Action; Application No. 2,779,836; Sep. 18, 2013; 2 pages.
Canadian Office Action; Application No. 2,779,852; Sep. 18, 2013; 2 pages.
Chin, Chen-Ho, et al.; U.S. Appl. No. 13/508,302, filed May 4, 2012; Title: Methods and Mechasnisms for Managing Priority Calls in a Cell.

* cited by examiner

METHODS AND MECHANISMS FOR MANAGING PRIORITY CALLS IN A CELL

CROSS REFERENCE

This application is a filing under 35 U.S.C. 371 of International Application No. PCT/US2010/055591 filed Nov. 5, 2010, entitled "Method and Mechanisms for Managing Priority Calls in a Cell" claiming priority to U.S. Provisional Application No. 61/259,067 filed on Nov. 6, 2009, entitled "Method and Mechanisms for Managing Priority Calls in a Cell", which are incorporated by reference herein as if reproduced in their entirety.

BACKGROUND

A traditional cell in a wireless telecommunications system might cover a relatively large geographical area. To enhance the coverage of such a macro cell, one or more smaller scale cells might be located in or near the macro cell and might provide a wireless device with a more reliable connection than might be available with the macro cell alone. For example, if a small-scale cell is created inside a house, wireless devices in the house might connect to a macro cell through the small-scale cell and might receive a better quality of service than if they connected directly to the macro cell. These small-scale cells are known by various names, such as microcells, picocells, femtocells, hot zone cells, relay cells, and the like.

Access to a small-scale cell might be restricted to only certain authorized users, who can be referred to as a closed subscriber group or CSG. For example, members of a family who live in a house covered by a small-scale cell might make up a CSG. Hereinafter, these small-scale cells will be referred to as CSG cells. In some cases, multiple CSG cells might be available to a single CSG. For example, a company with several buildings in a single campus might maintain a CSG cell in each of the buildings, and employees who are authorized to access the CSG cells would comprise a CSG.

A small-scale cell might allow access to both its authorized users, i.e., users that subscribe to the CSG to which the small-scale cell belongs, and unauthorized users, i.e., users that do not subscribe to the CSG to which the small-scale cell belongs. This type of small-scale cell is called a hybrid cell. The authorized users may be provided preferential services in a hybrid cell over the unauthorized users.

The embodiments described herein are applicable to CSG cells, hybrid cells, and other types of small-scale cells, as well as macro cells that have limited resources. As used herein, the term "CSG cell" refers to any such cell.

The physical equipment and software that create a CSG cell cell can function analogously to a base station, a node B, or an enhanced node B (eNB) in a traditional cell and might called a home node B, a home eNB (HeNB), or a similar name. Hereinafter, this equipment and software will be referred to as a HeNB, but it should be understood that a HeNB is not necessarily used only in a home and is not necessarily an eNB.

Devices, systems, and/or software that can connect to a HeNB may include mobile phones, mobile wireless devices (including digital, cellular, or dual mode devices), personal digital assistants, laptop/tablet/notebook computers, desktop computers, or any other end user device or system that can connect to a wireless telecommunications network. Hereinafter, such a device, system, and/or software will be referred to as user equipment or UE.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
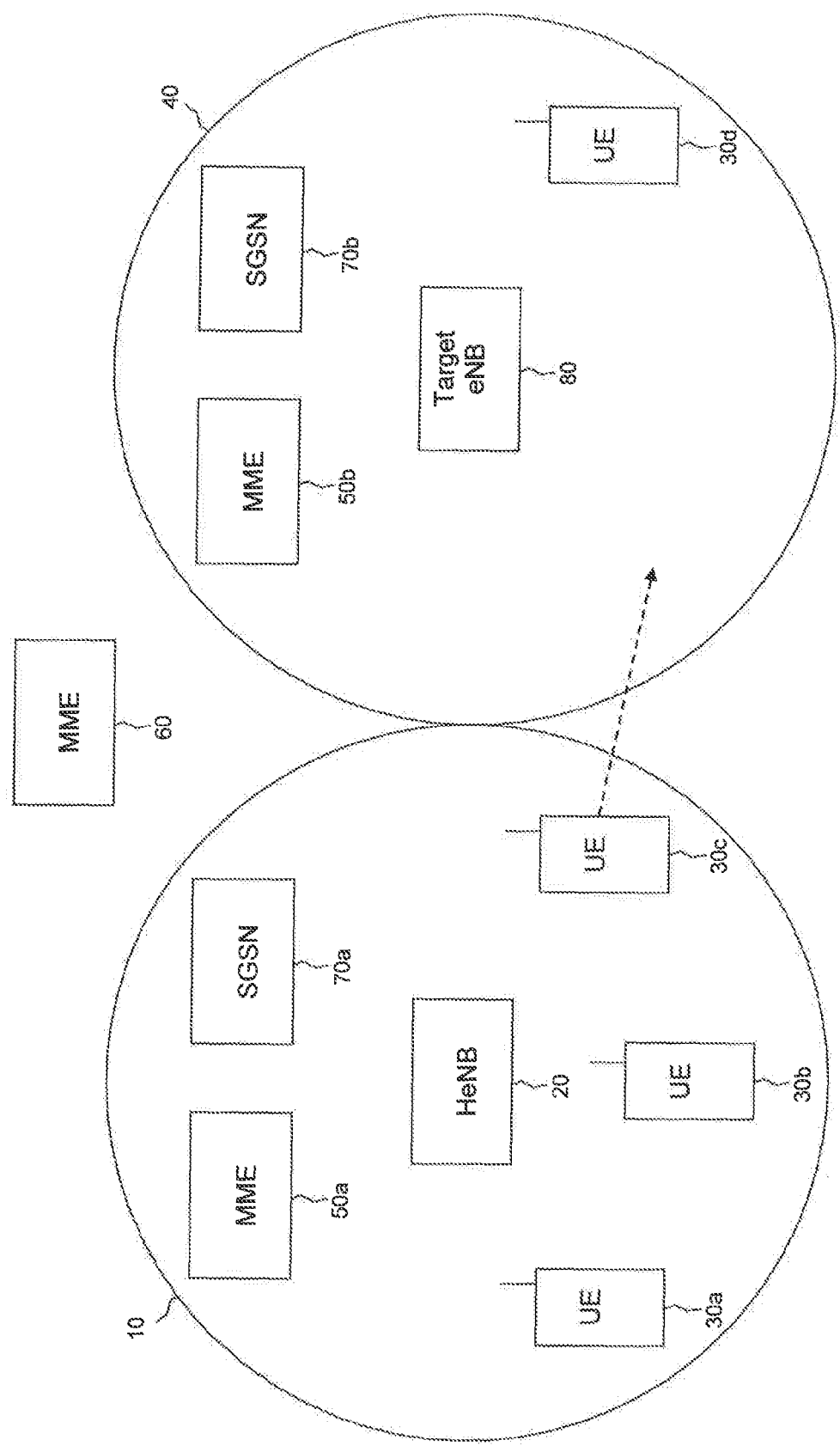
FIG. 1 is a diagram of an illustrative telecommunications system including a plurality of cells, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A CSG cell can provide only a limited amount of resources for handling calls. When the number of calls in progress in a CSG cell is at or near its maximum allowed by the resources available in the CSG cell either over the radio access or over a network connection, there may not be sufficient capacity for an additional emergency call or non-emergency to be established in the CSG cell. If a high priority call, such as an emergency call, is attempted from a CSG cell, an inability to connect the high priority call due to congestion conditions or lack of resources in the CSG cell could have unfortunate consequences.

Embodiments of the present disclosure provide methods and mechanisms that increase the likelihood that a priority call that is attempted from a CSG cell will be successfully completed. As used herein, the term "priority call" might refer to an emergency call, such as a 911 call (in North America) or a 112 call (in most of Europe), that might be handled by a Public Safety Answering Point (PSAP). Alternatively, the term "priority call" might refer to some other type of call that has a higher priority than another call. Hereinafter, the term "emergency call" might be used to refer to any priority call.

In an embodiment, when an emergency call is attempted from a CSG cell, one or more non-emergency calls that are currently in progress in the CSG cell might be handed over to another cell. If sufficient resources are available for the emergency call being attempted, no non-emergency calls may need to be handed over. The number of calls that are handed over can be based on the configuration of the HeNB for the cell and on the resources available in the CSG cell. That is, when a request for an emergency call is made in a CSG cell, an assessment is performed of the resources available in the cell, and a determination is made of how many, if any, non-emergency calls need to be handed over in order to ensure that sufficient resources are available for the successful completion of the emergency call. If it is determined that one or more non-emergency calls are to be handed over, the determined number of non-emergency calls are then handed over to a macro cell in the same CSG, to another CSG cell in the same CSG, or to a CSG cell in another CSG within the list of CSGs allowed for the UE. The CSG cell can trigger the handover of non-emergency calls once the emergency call being attempted is progressing or once it is established.

A system in which these methods might be implemented is illustrated in FIG. 1, where a serving cell, such as a CSG cell 10, is served by a HeNB 20. A plurality of UEs 30 that belong to the same CSG can communicate with the HeNB 20. In this example, three UEs 30 are shown, but in other embodiments other numbers of UEs 30 could be present. A single neighbor cell 40, which might be a CSG cell or a macro cell, is shown, but additional neighbor cells might be present.

The CSG cell 10 and the other cell 40 might be served by different mobility management entities (MMEs) 50, or a single MME 60 might serve both cells. When each cell is served by a different MME 50a and 50b, a handover from the CSG cell 10 to the other cell 40 can be considered an inter-MME handover. When both cells are served by the same MME 60, a handover from the CSG cell 10 to the other cell 40 can be considered an intra-MME handover. An MME is a core network element with which the HeNB 20 might communicate in a network based on EUTRA (Evolved UMTS (Universal Mobile Telecommunications System) Terrestrial Radio Access). For other wireless technologies, such as UTRAN or GERAN (GSM (Global System for Mobile communications) EDGE (Enhanced Data rates for GSM Evolution) Radio Access Network), a Serving GPRS (General Packet Radio Services) Support Node (SGSN) 70 may be the core network element that performs functions similar to those performed by an MME in an EUTRA network (EUTRAN). Thus, while both the MME 50 and the SGSN 70 are depicted in each of the cells 10 and 40, only one or the other of these core network elements would typically be associated with a cell.

Also, it should be noted that the HeNB 20 might be present in an EUTRAN cell, but in a GERAN/UTRAN cell, the equivalent component might be a home node B or HNB. Hereinafter, any such component might be referred to as the HeNB 20, regardless of whether the CSG cell is an EUTRAN cell, a GERAN cell, or a UTRAN cell.

In an embodiment, if UE 30b and UE 30c, for example, are on non-emergency calls via the HeNB 20, and if UE 30a attempts to initiate an emergency call via the HeNB 20, one or both of UE 30b and UE 30c might be handed over to the other cell 40. Alternatively, if it is determined that sufficient resources are available in the CSG cell 10 for the emergency call being attempted by UE 30a, neither of the non-emergency calls might be handed over to the other cell 40. Hereinafter, it will be assumed that UE 30c is handed over to the other cell 40 when UE 30a initiates an emergency call, but it should be understood that one or more additional UEs might be handed over or that no UEs at all might be handed over.

More specifically, in an embodiment, when the HeNB 20 detects a request for access for an emergency call (for example, in the establishment cause carried in a RRC_Connection_Request message), the HeNB 20 might initiate handover triggers to one of the MMEs 50 or 60 for one or more non-emergency calls that are active in the CSG cell 10. As used herein, the terms "trigger" and the like can refer to any event that directly or indirectly causes another event to occur, such as creating, sending, and/or causing the sending of a message.

In an embodiment, a new trigger cause is provided by the HeNB 20 when initiating this eNB/network-triggered handover in the case where the handover is to a macro cell (that is, the handover is not to another CSG cell). In another embodiment, a new trigger cause is provided by the HeNB 20 when initiating this eNB/network-triggered handover in the case where the handover is to another CSG cell. This trigger cause can be termed, for instance, "Offload traffic for emergency session" or some other aptly termed trigger cause. This trigger cause can be added to the S1 interface signaling from the eNB/EUTRAN to the source MME 50a in a HANDOVER REQUIRED message either as a new decode of cause values or as a new cause information element (IE). The trigger cause might be passed from the source MME 50a to the target MME 50b or SGSN 70b if the target cell 40 is covered by another MME 50b or SGSN 70b for a handover to an EUTRAN cell or a UTRAN/GERAN cell.

This method is also applicable to EUTRAN working in X2 interface configurations, in which case the handover request/response might be between the HeNB 20 and a target eNB 80 over the X2 interface. While the target component in this configuration is referred to herein as an eNB, it should be understood that this component might be a traditional base station, a node B, a HeNB, a WiFi or WiMAX router, or any similar component that can act as a wireless access point for the UEs 30. Any such component, including the HeNB 20, might be referred to herein as an access device.

For a handover to another CSG cell, the handover can be to a CSG cell in the same CSG or to a CSG cell in another CSG that the UE 30c is allowed to access. In these cases, the HeNB 20 may select the target cell 40 based on CSG information. For example, during the attach and related procedures of the HeNB 20, the source MME 50a might provide the HeNB 20 with the IDs of the allowed CSGs for the UE 30c, so that the HeNB 20 can select a target cell in another CSG. In some embodiments, the attach and related procedures are the Initial Context Setup Request message sent from the MME to the serving HeNB or eNB to setup the UE context, the UE Context Modification Request message sent from the MME to the serving HeNB or eNB, and the Handover Request message sent from the MME to the target HeNB or eNB.

Once an emergency call that is initiated from a CSG cell has been established, it is desirable that the call should continue without an unwanted disconnection. If a non-emergency call were to be initiated in or handed over to a congested CSG cell in which an emergency call was in progress, the non-emergency call could consume enough resources to cause the emergency call to be dropped. For example, returning to FIG. 1, if UE 30a is engaged in an emergency call, and if multiple non-emergency calls are initiated in or handed over to the CSG cell 10, the emergency call on UE 30a might be disconnected.

In an embodiment, in order to ensure that there are sufficient resources to maintain an ongoing emergency call in the CSG cell 10, non-emergency calls are handled using one or more of four different methods. Two of the methods deal with preventing a call that has just been handed out of the CSG cell 10 from being handed back in. For example, if UE 30c is handed over to the other cell 40 and then performs cell measurements on the neighboring cells, UE 30c might determine that the signal quality is better in the CSG cell 10 than in the other cell 40 and might request to be handed over to the CSG cell 10. Two of the methods described below are intended to prevent an outbound handover from being followed by such a nearly immediate inbound handover or an inbound handover before the CSG cell can be capable of accepting non-emergency calls. Another of the methods deals with preventing handovers from other cells into the CSG cell 10, and another of the methods deals with handling idle UEs 30 that are camped in the CSG cell 10 and that might attempt to initiate a non-emergency call in the CSG cell 10.

In the first of the two methods for preventing a call from being handed back in to the CSG cell 10 after having just been handed out of the CSG cell 10 due to an emergency call in the CSG cell 10, an indication of the cause of the handover of the UE and/or a timer are used to prevent the call from being handed back in for a specified time. In a first variation of the first method, the HeNB 20 includes the cause indicator and/or timer value in a message to the core network that triggered the handover or to the target cell to which the UE is handed over. In a second variation of the first method, the timer value and/or cause indicator are provided in a message to the UE 30c that is being handed over, for example in a message instructing the UE to perform the handover.

Under the first variation, six different options are available depending on the types of networks that are involved in the handover. In the following discussion, specific names, such as "HANDOVER REQUIRED" and "HANDOVER REQUEST", are given for various messages. It should be understood that the message names given hereinafter are examples that might apply to certain technologies and/or messaging protocols. In other circumstances, other messages that provide similar functionality could be used.

The first option deals with an intra-EUTRAN handover. That is, both the CSG cell 10 and the other cell 40 are EUTRAN cells. In this option, the timer value is included in a HANDOVER REQUIRED message from the HeNB 20 to one of the source MMEs 50a or 60 or to the target MME 50b. For an intra-MME handover, the source MME is MME 60, and for an inter-MME handover, the source MME is MME 50a. When the timer value is sent to the source MME 50a or 60, the source MME 50a or 60 does not accept handover requests to the HeNB 20 for the specified time for the call that was handed over. In this case, the timer value is specified on a per-HeNB basis. Alternatively, for an inter-MME handover, the timer value can be sent to the target MME 50b. In this case, the timer value is specified on a per-UE basis, and the target MME 50b, upon receiving the timer value, does not allow the UE 30c to be handed back to the CSG cell 10 for the specified time.

The second option also deals with an intra-EUTRAN handover. In this option, the timer value is again included in a HANDOVER REQUIRED message from the HeNB 20 to one of the MMEs 50a or 60, but the timer value is then passed from the MME 50a or 60 to the target eNB 80 in a HANDOVER REQUEST message. The target eNB 80 then knows that the CSG cell 10 from which the UE 30c was handed over is not a suitable cell for a handover for the period of time specified by the timer value. In the case of a handover via the X2 interface, the timer value can be included in a HANDOVER REQUEST message from the HeNB 20 to the target eNB 80.

In some embodiments of the first and second options, a Hold Off Time is added to the Cause IE included in the Handover Required message sent from the source eNB to the MME and the Handover Request message sent from the MME to the target eNB. In the case of a handover via the X2 interface, a Hold Off Time is added to the Cause IE included in the Handover Request message sent from the source eNB to the target eNB. In an embodiment, the Hold Off Time is only included if the Radio Network Layer Cause is set to "Offload traffic for emergency call".

The third option deals with a handover of a call from an EUTRAN cell to either a UTRAN cell or a GERAN cell. In this option, the timer value is included in a HANDOVER REQUIRED message from the HeNB 20 to a source MME, which is MME 50a in the case of an inter-MME handover and is MME 60 in the case of an intra-MME handover. For the specified time, the source MME 50a or 60 does not accept requests for that call to be handed over to the CSG cell 10.

The fourth option deals with a handover of a call from a UTRAN cell to an EUTRAN cell. In this case, the timer value is included in a Source RNC RELOCATION REQUIRED message from the HeNB 20 to the source SGSN 70a. For the specified time, the source SGSN 70a does not accept requests for that call to be handed over to the CSG cell 10. Alternatively, the source SGSN 70a passes the timer value on to the target eNB 80 in a HANDOVER REQUEST message. The target eNB 80 then knows that the CSG cell 10 from which the UE 30c was handed over is not a suitable cell for a handover for the period of time specified by the timer value.

The fifth option deals with a handover of a call from a GERAN cell to an EUTRAN cell. In this case, the timer value is included in a Source BSS PS HANDOVER REQUIRED message from the HeNB 20 to the source SGSN 70a. For the specified time, the source SGSN 70a does not accept requests for that call to be handed over to the CSG cell 10. Alternatively, the source SGSN 70a passes the timer value on to the target eNB 80 in a HANDOVER REQUEST message. The target eNB 80 then knows that the CSG cell 10 from which the UE 30c was handed over is not a suitable cell for a handover for the period of time specified by the timer value. It can be seen that the fourth and fifth options are similar except for the messages in which the timer value is sent from the HeNB 20 to the source SGSN 70a.

The sixth option deals with a handover of a call from a UTRAN cell to another UTRAN cell. This option is similar to the fourth option in that the timer value is included in a Source RNC RELOCATION REQUIRED message from the HeNB 20 to the source SGSN 70a. For the specified time, the source SGSN 70a does not accept requests for that call to be handed over to the CSG cell 10. Alternatively, the source SGSN 70a passes the timer value on to the target eNB 80 in a HANDOVER REQUEST message. The target eNB 80 then knows that the CSG cell 10 from which the UE 30c was handed over is not a suitable cell for a handover for the period of time specified by the timer value.

In the second variation of the first method for preventing a call from being handed back in to the CSG cell 10 after having just been handed out of the CSG cell 10 due to an emergency call in the CSG cell 10, a timer value and/or an indicator of the cause for the handover are provided in a message to the UE 30c that is being handed over. More specifically, a timer value and/or cause indicator might be provided to the UE 30c in a HANDOVER COMMAND message that instructs the UE 30c to perform the handover. The HANDOVER COMMAND message might be, for example, an RRC_Connection_Reconfiguration message that includes the MobilityControlInfo IE. In an embodiment, a Hold Off Time is added to the MobilityControlInfo IE.

The UE 30c can take the timer value into account in one or more of several different ways. In one option, for the time specified by the timer value, the UE 30c considers the CSG cell 10 from which it moved to be an unsuitable cell on which to perform measurements and for which to report measurements to the network. The UE 30c may continue to perform and report measurements on other cells. In another option, the UE 30c continues to perform measurements on the CSG cell 10 from which it was handed over, but for the time specified by the timer value, the UE 30c does not report measurements for that cell 10. In another option, the UE 30c reports measurements on the CSG cell 10 from which it was handed over, but for the time specified by the timer value, the UE 30c includes in the measurement reports an indication to the network that a handover should not be attempted to that cell 10. In this option, the network processes the indication that a handover should not be attempted to that cell 10 by excluding the measurement report for cell 10 in the decision to trigger an handover for the UE, and the network can use the measurement for interference management purposes or other purposes. This option does not affect the use of measurements by the network for interference management purposes.

In yet another option under this variation, for the time specified by the timer value, the UE 30*c* may avoid performing a preliminary access check/handover evaluation for the CSG cell 10 from which it was handed over. This option may be combined with one of the above options, so that any scheduled measurement gap is not used to measure the requested cell. In still another option, the UE 30*c* may avoid including the PCI/PSC of the CSG cell 10 from which it was handed over in its measurement reports, such as Release 8 format measurement reports, thus avoiding network scheduling gaps for that cell 10 and allowing room for reporting of other cells.

When this second variation of the first method is used, the new serving cell 40 (most likely a macro cell) is not required to keep track of neighbor CSG cells and their respective load states. Also, not sending measurements for CSG cells may result in less information being transmitted when a measurement report is sent, since measurement reports for CSG cells are highly complex and contain a great deal of information (such as a CSG ID, a global Cell ID, and core network routing information).

In the second of the two methods for preventing a non-emergency call from being handed back in to the CSG cell 10 after having just been handed out of the CSG cell 10 due to an emergency call in the CSG cell 10, the target eNB 80 receives information that allows the target eNB 80 to infer that the non-emergency call was handed over because of the initiation of an emergency call in the CSG cell 10. The target eNB 80 can make this inference in one of two ways. In one possibility, a cause indicator is included in a handover request message to indicate to the target eNB 80 that the non-emergency call was handed over because of the initiation of the emergency call or congestion due to emergency calls in the CSG cell 10. In another possibility, the target eNB 80 infers, from the presence of a timer value as described above, that the cause of the handover was an emergency call in the CSG cell 10.

When the target eNB 80, through either of these two ways, learns that a non-emergency call has been handed over to it because of an emergency call in the CSG cell 10, the target eNB 80 can take appropriate steps to prevent the non-emergency call from being handed back to the CSG cell 10. In one option under this method, the target eNB 80 informs the UE 30*c* that a cell-specific, greater-than-normal hysteresis and/or offset should be applied to the cell measurement reporting criteria for the CSG cell 10 from which the UE 30*c* was handed over. That is, the target eNB 80 instructs the UE 30*c* to use a larger than usual signal quality threshold for the CSG cell 10 so that measurement reporting is not triggered for the CSG cell 10 unless the difference in signal quality between the CSG cell 10 and the other cell 40 is significantly greater than the difference that typically triggers measurement reporting.

The target eNB 80 may indicate to the UE 30*c* that the cell-specific hysteresis and/or offset should be applied for a duration indicated in a timer value. In one embodiment, during the time period specified by the timer value, the target eNB 80 configures (via RRC signaling to the UE 30*c*, for example) a cell-specific offset for the CSG cell 10 in the measurement object corresponding to the carrier frequency of the CSG cell 10. When the timer has expired, the target eNB 80 may send RRC signaling to the UE 30*c* to remove the cell-specific offset from the measurement object.

In another option under this method, the UE 30*c* might be aware of the cell-specific hysteresis and/or offset that are to be applied to the cell measurement reporting criteria for the CSG cell 10 after the UE 30*c* moves from the CSG cell 10 due to an emergency call. The UE 30*c* then applies these pre-defined parameters for the duration of the timer value upon being informed by the target eNB 80 of the timer value.

In another option under this method, the UE 30*c* might be aware of the timer value, e.g. through the handover command sent by the source HeNB to the UE to initiate the handover. The UE 30*c* then applies, for the duration of the timer value, the cell-specific hysteresis and/or offset once these parameters are provided by the target eNB 80.

In another option under this method, the UE 30*c* might be aware of the timer value as well as the cell-specific hysteresis and/or offset. The UE 30*c* then applies the pre-defined parameters for the pre-defined time after the UE 30*c* is handed over to the target eNB 80.

In the third method of ensuring that there are sufficient resources to maintain an ongoing emergency call in the CSG cell 10, handovers from other cells into the CSG cell 10 are prevented while the emergency call is in progress. The CSG cell 10 is considered the target cell in this method, since an attempt might be made to hand an existing call over into the CSG cell 10. The other cell 40 is the source cell, since the call might be handed over from that cell. For example, an attempt might be made to hand a call on UE 30*d* over into the CSG cell 10 while UE 30*a* is on an emergency call. In an embodiment, to prevent such handovers, five options are provided, which might be implemented independently, in various combinations with one another, and/or in various combinations with the two methods described above.

In the first option, when the MME 50*a* or the MME 60 receives a handover request message for which the target cell is the CSG cell 10 that is handling an emergency call, the MME 50*a* or 60 rejects the message. The MME 50*a* or 60 includes in the rejection message a rejection cause that indicates that the reason for the rejection is that the CSG cell 10 is offloading non-emergency calls due to an ongoing emergency call. Alternatively, the rejection message includes a timer value whose presence indicates that the reason for the rejection is that the CSG cell 10 is offloading non-emergency calls due to an ongoing emergency call and indicates how long handovers to the CSG cell 10 will be prevented. Alternatively, the rejection message includes a rejection cause that indicates that the reason for the rejection is that the CSG cell 10 is offloading non-emergency calls due to an ongoing emergency call and a timer value that indicates how long handovers to the CSG cell 10 will be prevented. More specifically, the handover request message might be a HANDOVER REQUIRED message, and the rejection message might be a HANDOVER PREPARATION FAILURE message. For an intra-MME handover, it is the serving MME 60 that rejects the handover request, and for an inter-MME handover, it is the target MME 50*a* that rejects the handover request.

In some embodiments of the first option, the CSG cell 10 includes the Cause IE in the HANDOVER REQUIRED message and sets the Radio Network Layer Cause to 'Offload traffic for emergency call' if the reason for requesting the handover of a UE is to reduce the load of the CSG cell 10 in order for the CSG cell 10 to handle emergency calls. The CSG cell 10 may, in addition, include the Hold Off Time in the Cause IE to indicate the duration during which handover into the CSG cell 10 should be prevented. If the MME 50*a* or 60 receives the Cause IE in the HANDOVER REQUIRED message with the Radio Network Layer Cause set to 'Offload traffic for emergency call', the MME 50*a* or 60 rejects handover request, into the CSG cell 10 by sending a HANDOVER PREPARATION FAILURE message in response to a HANDOVER REQUIRED message that requested the handover to the CSG cell 10. If the MME 50*a* or 60 receives the Cause IE in the HANDOVER REQUIRED message with the Radio Network Layer Cause set to 'Offload traffic for emergency call' and the Hold Off Time is included, the MME 50*a* or 60 prevents handover of UEs into the CSG cell 10 for the duration specified by the Hold Off Time by sending a HANDOVER PREPARATION FAILURE message in response to a HANDOVER REQUIRED message that requested the handover to the CSG cell 10.

In the second option, when the HeNB 20 learns that it is handling an emergency call, the HeNB 20 informs the MME 50*a* or 60 that no requests on the HeNB's resources should be made. The HeNB 20 can provide this information to the MME 50*a* or 60 by including in a message to the MME 50*a* or 60 a new IE, a new information field in an existing IE, or a new decode within an appropriate information field or IE. More specifically, the HeNB 20 might learn that it is handling an emergency call at RRC connection establishment time, and the message from the HeNB 20 to the MME 50*a* or 60 might be an S1 interface initial setup message or any other appropriate S1 interface message, such as an eNB Configuration Update message.

In some embodiments of the second option, an Admission Control IE is added to the S1 SETUP REQUEST message and ENB CONFIGURATION UPDATE message sent from the HeNB 20 to the MME 50*a* or 60 to indicate whether a new UE can be admitted to the CSG cell 10.

In the third option, when the MME 50*a* or 60 receives a handover request message for which the target cell is the CSG cell 10 that is handling an emergency call, the MME 50*a* or 60 passes the request to the HeNB 20, and the HeNB 20 rejects the message. The HeNB 20 might include in the rejection message a rejection cause that indicates that the reason for the rejection is that the CSG cell 10 is offloading non-emergency calls due to an ongoing emergency call. The rejection message might, alternatively or in addition, include a timer value that indicates how long handovers to the CSG cell 10 will be prevented. More specifically, the handover request message to the MME 50*a* or 60 might be a HANDOVER REQUIRED message, and the MME 50*a* or 60 might pass the handover request to the HeNB 20 in a HANDOVER REQUEST message. The HeNB 20 might then reject the HANDOVER REQUEST message with a HANDOVER FAILURE message. It can be seen that this option is similar to the first option, except that the HeNB 20, rather than the MME 50*a* or 60, rejects the handover request.

The fourth option deals with UTRAN to EUTRAN handovers and GERAN to EUTRAN handovers. When the MME 50*a* or the MME 60 receives a handover request message for which the target cell is the CSG cell 10 that is handling an emergency call, the MME 50*a* or 60 rejects the message. In this case, the handover request message comes from the source SGSN 70*b*. The MME 50*a* or 60 might include in the rejection message a rejection cause that indicates that the reason for the rejection is that the CSG cell 10 is offloading non-emergency calls due to an ongoing emergency call. The rejection message might, alternatively or in addition, include a timer value that indicates how long handovers to the CSG cell 10 will be prevented. More specifically, in this case, the handover request message might be a FORWARD RELOCATION REQUEST message, and the rejection message might be a FORWARD RELOCATION REQUEST (Reject) message. It can be seen that this option is similar to the first option, except that different request and rejection messages are used and the handover request comes from the source SGSN 70*b* rather than from the source MME 50*b*.

The fifth option deals with EUTRAN to UTRAN handovers and EUTRAN to GERAN handovers. In this case, the target SGSN 70*a* receives a handover request message from the source MME 50*b* and the rejects the message. The target SGSN 70*a* might include in the rejection message a rejection cause that indicates that the reason for the rejection is that the CSG cell 10 is offloading non-emergency calls due to an ongoing emergency call. The rejection message might, alternatively or in addition, include a timer value that indicates how long handovers to the CSG cell 10 will be prevented. More specifically, in this case, the handover request message might be a FORWARD RELOCATION REQUEST message, and the rejection message might be a FORWARD RELOCATION REQUEST (Reject) message. It can be seen that this option is similar to the fourth option, except that the handover request comes from the source MME 50*b* and is received by the target SGSN 70*a*, and the target SGSN 70*a* sends the rejection message.

In the fourth method of ensuring that there are sufficient resources to maintain an ongoing emergency call in the CSG cell 10, idle UEs 30 that are camped in the CSG cell 10 are prevented from initiating an ongoing non-emergency call in the CSG cell 10 while the emergency call is in progress in the CSG cell, and the CSG cell may or may not have reached the number of maximum calls allowed by the CSG cell resources. Whether the CSG cell 10 decides to prevent idle UEs 30 that are camped in the CSG cell from initiating a non-emergency call only when the maximum amount of resources available in the cell has been reached or not is configured in the CSG cell. In an embodiment, three options are provided to handle such call initiations.

In the first option, the CSG cell 10 accepts the non-emergency call but then, with minimal delay, hands the non-emergency call over to another cell. The handover message or HANDOVER COMMAND generated by the CSG cell 10 can include an indicator that the reason for the handover is the emergency call in progress in the CSG cell 10. In one embodiment, the handover message or HANDOVER COMMAND generated by the CSG cell 10 also includes a timer value that indicates how long call or handover attempt to the CSG cell 10 should be prevented. In one implementation, the timer value only applies to non-emergency call or handover attempts. In another implementation, the timer value applies to both non-emergency and emergency call or handover attempts. One or more of the methods described above might be used to prevent the non-emergency call from being handed back to the CSG cell 10.

In some embodiments of the first option, a Handover Cause that indicates that the reason for the handover is the emergency call in progress in the CSG cell 10 and a Hold Off Time are added to the MobilityControlInfo IE in the RRCConnectionReconfiguration message sent from the CSG cell 10 to the UE 30.

In the second option, the CSG cell 10 rejects the non-emergency call. More specifically, if the connection request is an RRC_Connection_Request message, the CSG cell 10 might reject the request with an RRC_Connection_Reject message. The rejection message generated by the CSG cell 10 can include an indicator that the reason for the rejection is the emergency call in progress in the CSG cell 10. In some cases, the UE 30 that is rejected knows it should not try to access that CSG cell 10 for an implementation-dependent time. In other cases, the rejection message can include a timer value, and the UE 30 that is rejected does not try access that CSG cell 10 for the period of time specified by the timer. In one embodiment, only one of the rejection cause or the timer value is included in the rejection message. In another embodiment, both the rejection cause and the timer value are included in the rejection message.

In an alternative of the second option, the CSG cell 10 rejects the non-emergency call with rejection message that includes a cause code indicating congestion. The rejection message can also include redirection information, such as a UTRA Absolute Radio Frequency Channel Number (UARFCN), so that the UE 30 that is rejected is forced to attempt to connect to a macro cell. One of the UEs 30 that is rejected in this manner would not necessarily be prevented from attempting to return to the CSG cell 10, so the inclusion of a timer value to prevent the return of the UE 30 may be especially appropriate in this alternative. The timer value might be specified as described above or might be the "wait time" that is currently carried in the RRC_Connection_Reject message and that can have an effect similar to that of the timer value described above.

In some embodiments of the second option above, a holdOffTime, rejectionCause and redirectionInfo are added to the RRCConnectionReject message sent from CSG cell 10 to the UE 30.

In the third option, the CSG cell 10 accepts the emergency call but then, autonomously and with minimal delay, applies access class (AC) barring to non-emergency calls. This autonomous AC control by the CSG cell 10 can be a total blanket barring of all AC or it can be a cyclical barring of a few ACs depending on the available resources of the CSG cell 10. AC barring may be used to control a UE's access to the system, but such AC control has traditionally been triggered by the core network over the A/Gb interface (for GSM and GPRS) or the Iu interface (for UMTS) or the S interface (for LTE/SAE). In this embodiment, AC barring may be used for handling emergency calls, and the HeNB 20 performs this AC barring locally and autonomously.

After an emergency call is terminated, the PSAP may place a callback to the caller for various reasons. For example, if the emergency call appears to have terminated abnormally, the PSAP might call the caller back to determine if the caller wishes to convey any additional information. Alternatively, the PSAP might call the caller back to ask for information that was inadvertently not requested in the initial call. Other reasons for a callback from a PSAP to an emergency caller after the termination of an emergency call may be familiar to one of skill in the art.

It is desirable that the methods described above for preventing a non-emergency call from disrupting an emergency call should not prevent an emergency callback. In an embodiment, one or more of three different methods can be used to ensure that emergency callbacks are not prevented. In a first method, a UE that has previously placed an emergency call is allowed to answer a page, since the page could be for an emergency callback.

In a second method, when resources become available in a CSG cell in which AC barring was implemented, the CSG cell lifts the AC barring. In one option, the CSG cell lifts the AC barring when the emergency call ends. In another option, the CSG cell lifts the AC barring when the CSG cell detects that the UE has detached from the emergency packet data network. The HeNB can detect that the UE has detached by the fact that an evolved packet core request is made for the default evolved packet system bearer for the emergency packet data network to be removed when it is no longer needed.

In an third method, one or more of three different options can be used to improve the chances that a PSAP callback will be successful when a CSG cell is in a congestion situation. In the first option, if AC barring is in place, the AC barring is maintained for some time after the end of the emergency call in order to ensure the availability of resources for PSAP callback. The extra time that the CSG cell maintains the AC barring control can be an operator-configurable parameter, such as "ADDITIONAL TIME OF MAINTAINING AC CONTROL". During this additional time of applying AC barring, the CSG cell allows access to the UE that has just ended the emergency call. The CSG cell can do this by remembering the mobile identity of the UE (such as S-TMSI, IMEI, IMSI, TMSI, or P-TMSI) and comparing this mobile identity against any access attempts made during the "ADDITIONAL TIME OF MAINTAINING AC CONTROL". A UE that is expecting PSAP callback of an emergency call can continue to camp on the CSG cell even when the CSG cell has applied AC barring.

In the second option, when an emergency call ends, upon release of the connection, the UE is redirected to another CSG cell or macro cell. In an embodiment, a redirectedCellInfo, which includes the target cell's physical cell identity, is added to the RRCConnectionRelease message sent from the CSG cell to the UE. The UE then performs a registration update (such as a tracking area update, a routing area update, or a location area update) upon reaching the redirect cell, even if the tracking area, routing area, or location area of the redirect cell is the same as the tracking area, routing area, or location area of the CSG cell from which the UE was handed over. The imposition of this registration update allows the core network to know the location of the UE down to the cell level. Therefore, any subsequent paging to deliver the PSAP callback will be much quicker, as the granularity of the paging will be at the cell level.

In the third option, when a CSG/hybrid cell is handling emergency calls and experiencing resource limitation, the CSG/hybrid cell may downgrade the quality of service (QoS) of existing non-emergency radio access bearers (RABs) of different UEs. In some embodiments, the downgrade of QoS of a RAB is achieved through reducing the data rate of the assigned traffic channel. In UTRAN, this reduces the required transmit power from the HeNB in the downlink. In EUTRAN, this reduces the number of resource blocks assigned to the UE in the downlink. For the uplink, the reduction of the traffic channel data rate reduces the required uplink transmit power from the UE, thus reducing the loading caused by the UE. In one embodiment, only packet switched RABs are downgraded while circuit switched RABs are maintained as they were. In another embodiment, guaranteed bit rate (GBR) RABs are disconnected from the UE, while non-GBR RABs are downgraded.

Figure 2:
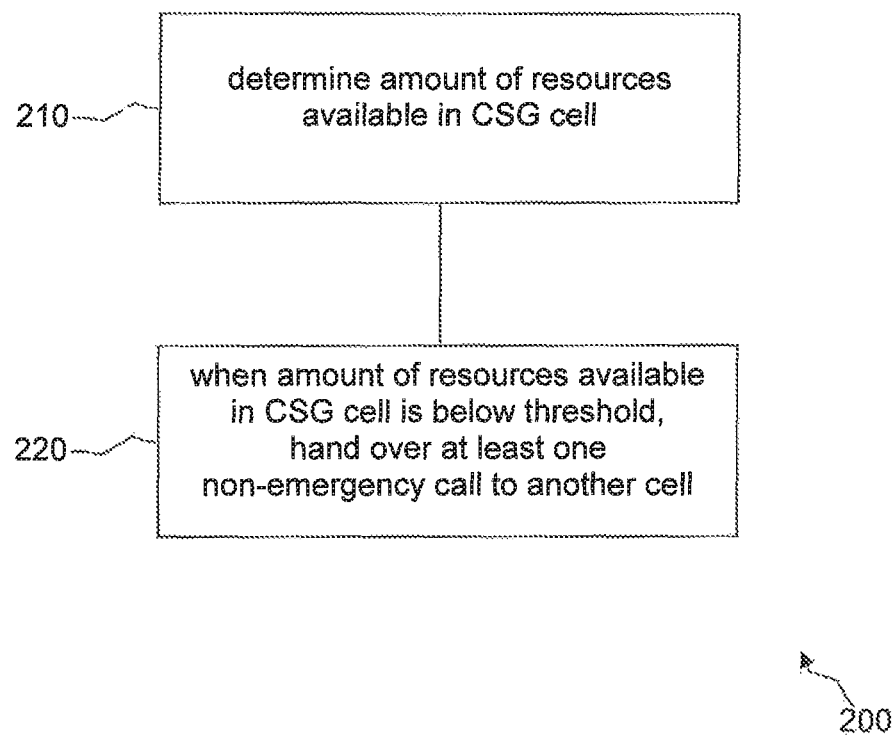
FIG. 2 illustrates an embodiment of a method for managing a priority call in a serving cell, according to an embodiment of the disclosure.

FIG. 2 illustrates an embodiment of a method 200 for managing an emergency call in a CSG cell. At block 210, the HeNB in the CSG cell determines the amount of resources available in the CSG cell. At block 220, when the amount of resources available in the CSG cell is below a threshold, at least one non-emergency call in the CSG cell is handed over to another cell.

Figure 3:
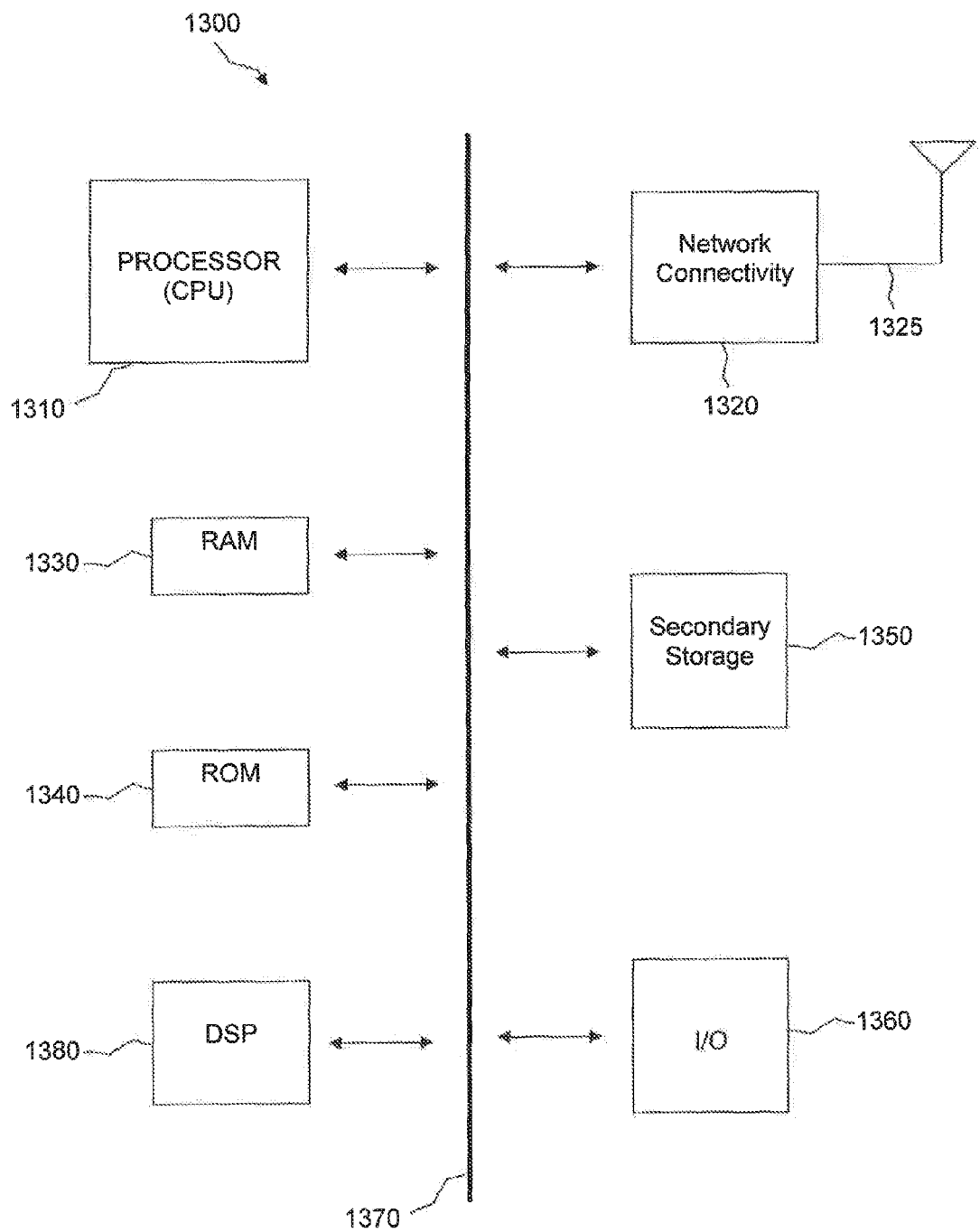
FIG. 3 illustrates a processor and related components suitable for implementing the several embodiments of the present disclosure.

The HeNB 20, UA 30, MME 50, SGSN 70, and other components described above might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for managing a priority call in a serving cell. The method comprises, when a priority call is in progress in the serving cell, performing at least one of preventing at least one non-priority call from being handed over into the serving cell and preventing at least one non-priority call from being initiated in the serving cell.

In another embodiment, an access device in a serving cell is provided that includes a processor configured such that, when a priority call is in progress in the serving cell, at least one of the following is performed: at least one non-priority call is prevented from being handed over into the serving cell and at least one non-priority call is prevented from being initiated in the serving cell.

In another embodiment, a core network element is provided that includes a processor configured such that, when a priority call is in progress in a serving cell associated with the core network element, at least one of the following is performed: at least one non-priority call is prevented from being handed over into the serving cell, and at least one non-priority call is prevented from being initiated in the serving cell.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing a priority call in a serving cell, comprising:
when a priority call is in progress in the serving cell, performing at least one of:
preventing at least one non-priority call from being handed over into the serving cell; and
preventing at least one non-priority call from being initiated in the serving cell.

2. The method of claim 1, wherein the serving cell is a closed subscriber group cell, and wherein the priority call is an emergency call.

3. The method of claim 1, wherein, when one of a Mobility Management Entity (MME) associated with the serving cell and a Serving GPRS (General Packet Radio Services) Support Node (SGSN) associated with the serving cell receives a request to hand over at least one non-priority call into the serving cell while the priority call is in progress in the serving cell, the one of the MME and the SGSN performs one of:
rejecting the request; and
passing the request to an access device in the serving cell, the access device in the serving cell then rejecting the request.

4. The method of claim 1, wherein, when an access device in the serving cell learns that the access device is handling the priority call, the access device informs one of an MME associated with the serving cell and an SGSN associated with the serving cell that no requests on the access device's resources should be made while the priority call is in progress in the serving cell.

5. The method of claim 1, wherein, when an attempt is made to initiate a non-priority call in the serving cell while the priority call is in progress in the serving cell, the serving cell performs one of:
rejecting the non-priority call;
accepting the non-priority call and handing the non-priority call over to another cell; and
applying access class barring to non-priority calls that are attempted in the serving cell while the priority call is in progress in the serving cell.

6. The method of claim 1, further comprising ensuring connection of a callback associated with the priority call by performing at least one of:
allowing a user equipment (UE) that placed the priority call to answer a page;
when access class barring is applied to non-priority calls in the serving cell, lifting the access class barring when resources become available in the serving cell;
when access class barring is applied to non-priority calls in the serving cell, extending the duration of the access class barring for non-priority calls but allowing access to the UE that placed the priority call;
upon release of the priority call connection, redirecting the UE that placed the priority call to another cell, the UE performing a registration update upon reaching the other cell; and
downgrading a quality of service of a non-priority radio access bearer in the serving cell.

7. The method of claim 1, wherein an access device in the serving cell causes at least one of the preventing the non-priority call from being handed over into the serving cell and the preventing the non-priority call from being initiated in the serving cell when the access device determines that an amount of resources available in the serving cell is below a threshold.

8. The method of claim 1, wherein the at least one of the preventing the non-priority call from being handed over into the serving cell and the preventing the non-priority call from being initiated in the serving cell occurs for a duration specified by a timer value included in a message that triggers the at least one of the preventing the non-priority call from being handed over into the serving cell and the preventing the non-priority call from being initiated in the serving cell.

9. An access device in a serving cell, comprising:
a processor configured such that when a priority call is in progress in the serving cell, at least one of the following is performed:
at least one non-priority call is prevented from being handed over into the serving cell; and
at least one non-priority call is prevented from being initiated in the serving cell.

10. The access device of claim 9, wherein the serving cell is a closed subscriber group cell, and wherein the priority call is an emergency call.

11. The access device of claim 9, wherein, when one of a Mobility Management Entity (MME) associated with the serving cell and a Serving GPRS (General Packet Radio Services) Support Node (SGSN) associated with the serving cell receives a request to hand over at least one non-priority call into the serving cell while the priority call is in progress in the serving cell, the one of the MME and the SGSN performs one of:
rejecting the request; and
passing the request to the access device in the serving cell, the access device then rejecting the request.

12. The access device of claim 9, wherein, when the access device learns that the access device is handling the priority call, the access device informs one of an MME associated with the serving cell and an SGSN associated with the serving cell that no requests on the access device's resources should be made while the priority call is in progress in the serving cell.

13. The access device of claim 9, wherein, when an attempt is made to initiate a non-priority call in the serving cell while the priority call is in progress in the serving cell, the access device performs one of:
rejecting the non-priority call;
accepting the non-priority call and handing the non-priority call over to another cell; and
applying access class barring to non-priority calls that are attempted in the serving cell while the priority call is in progress in the serving cell.

14. The access device of claim 9, wherein connection of a callback associated with the priority call is ensured by at least one of the following being performed:
allowing a user equipment (UE) that placed the priority call to answer a page;
when access class barring is applied to non-priority calls in the serving cell, lifting the access class barring when resources become available in the serving cell;
when access class barring is applied to non-priority calls in the serving cell, extending the duration of the access class barring for non-priority calls but allowing access to the UE that placed the priority;
upon release of the priority call connection, redirecting the UE that placed the priority call to another cell, the UE performing a registration update upon reaching the other cell; and
downgrading a quality of service of a non-priority radio access bearer in the serving cell.

15. The access device of claim 9, wherein the access device causes at least one of the preventing the non-priority call from being handed over into the serving cell and the preventing the non-priority call from being initiated in the serving cell when the access device determines that an amount of resources available in the serving cell is below a threshold.

16. The access device of claim 9, wherein the access device includes, in a message that triggers at least one of the preventing the non-priority call from being handed over into the serving cell and the preventing the non-priority call from being initiated in the serving cell, a timer value that specifies a duration for the at least one of the preventing of the non-priority call from being handed over into the serving cell and the preventing of the non-priority call from being initiated in the serving cell.

17. A core network element, comprising:
a processor configured such that when a priority call is in progress in a serving cell associated with the core network element, at least one of the following is performed:
at least one non-priority call is prevented from being handed over into the serving cell; and
at least one non-priority call is prevented from being initiated in the serving cell.

18. The core network element of claim 17, wherein the serving cell is a closed subscriber group cell, and wherein the priority call is an emergency call.

19. The core network element of claim 17, wherein the core network element is one of:
a Mobility Management Entity (MME) associated with the serving cell; and
a Serving GPRS (General Packet Radio Services) Support Node (SGSN) associated with the serving cell.

20. The core network element of claim 17, wherein, when the core network element receives a request to hand over at least one non-priority call into the serving cell while the priority call is in progress in the serving cell, the core network element performs one of:
rejecting the request; and
passing the request to an access device in the serving cell, the access device then rejecting the request.

21. The core network element of claim 17, wherein the core network element is informed by an access device in the serving cell that no requests on the access device's resources should be made while the priority call is in progress in the serving cell.

22. The core network element of claim 17, wherein connection of a callback associated with the priority call is ensured by at least one of the following being performed:
allowing a user equipment (UE) that placed the priority call, to answer a page;
when access class barring is applied to non-priority calls in the serving cell, lifting the access class barring when resources become available in the serving cell;
when access class barring is applied to non-priority calls in the serving cell, extending the duration of the access class barring for non-priority calls but allowing access to the UE that placed the priority call;
upon release of the priority call connection, redirecting the UE that placed the priority call to another cell, the UE performing a registration update upon reaching the other cell; and
downgrading a quality of service of a non-priority radio access bearer in the serving cell.

23. The core network element of claim 17, wherein the core network element receives from an access device in the serving cell a message that triggers at least one of the preventing the non-priority call from being handed over into the serving cell and the preventing the non-priority call from being initiated in the serving cell, the message including at least one of:
a timer value that specifies a duration for the at least one of the preventing the non-priority call from being handed over into the serving cell and the preventing the non-priority call from being initiated in the serving cell; and
an indicator indicating a cause of preventing the handover.

24. The core network element of claim 23, wherein the message is received when the access device determines that an amount of resources available in the serving cell is below a threshold.

* * * * *